Patented Feb. 21, 1950

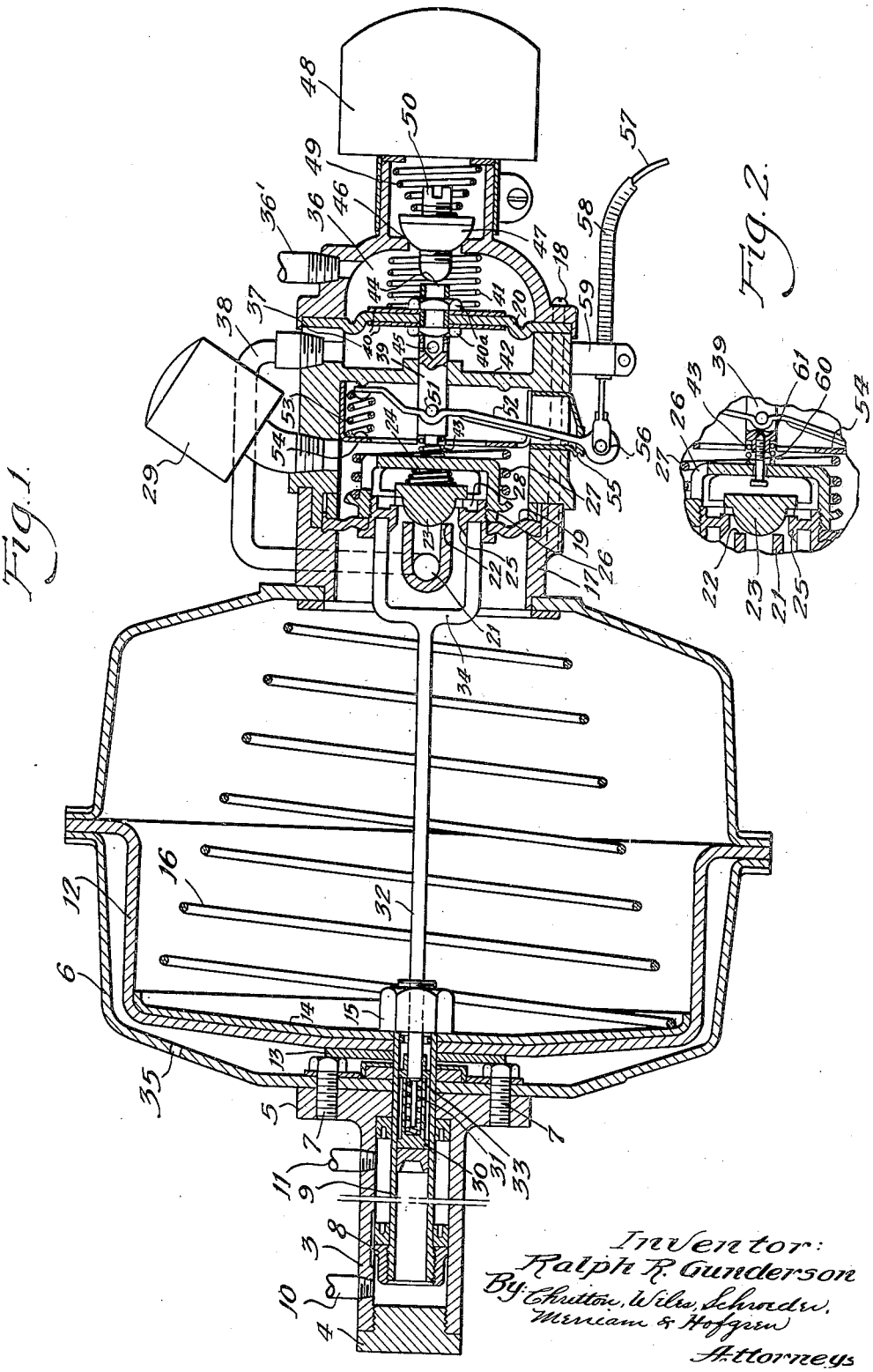

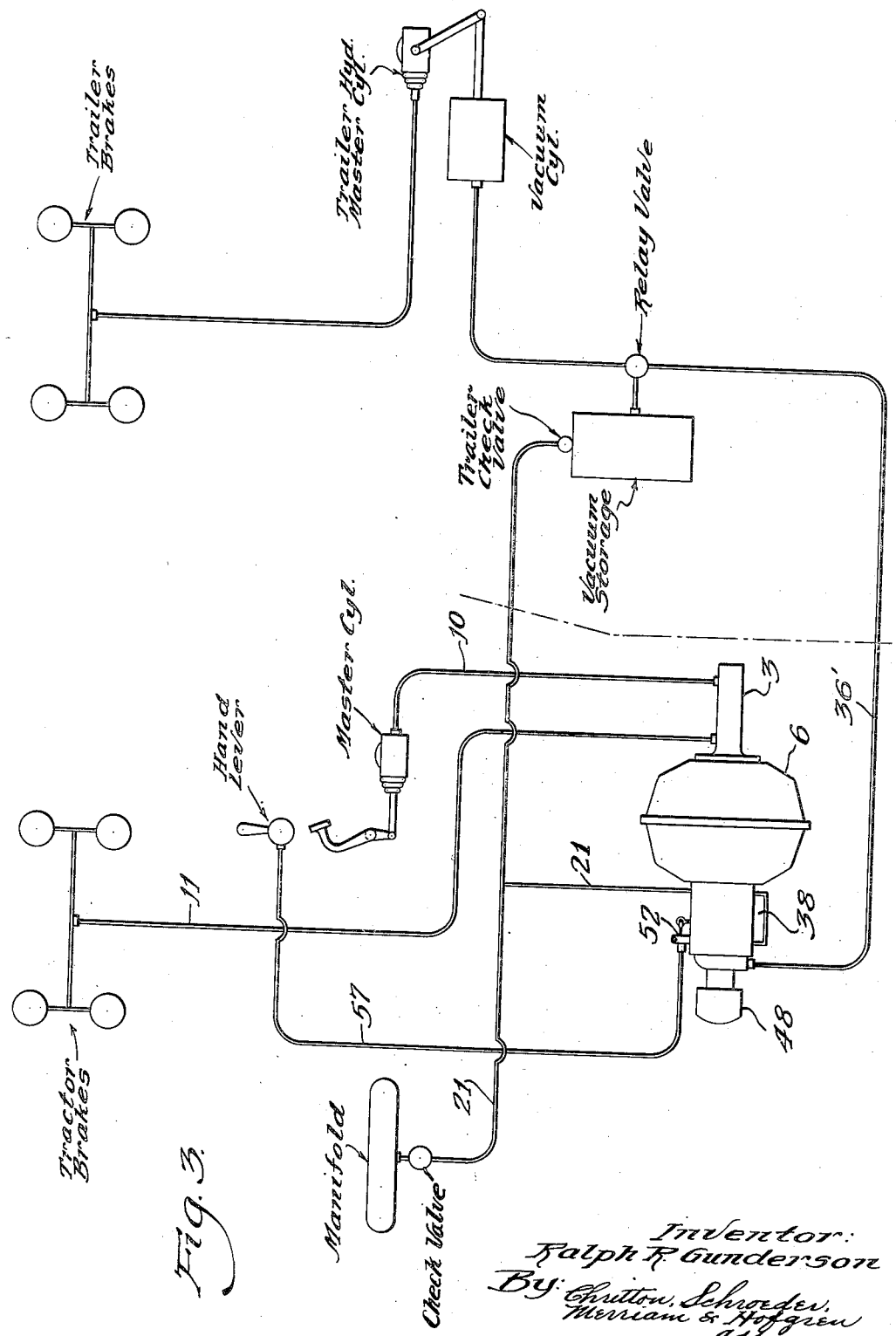

2,498,108

UNITED STATES PATENT OFFICE 2,498,108

VALVE MECHANISM FOR POWER BRAKES

Ralph R. Gunderson, Chicago, Ill.

Application December 28, 1945, Serial No. 637,718

9 Claims. (Cl. 188—3)

This invention relates to power brake mechanism of the type in which power is applied by a brake pedal and is augmented by a booster motor. More particularly the invention relates to a coordinating valve mechanism for controlling a booster motor on a tractor and simultaneously controlling the brakes on a trailer.

The primary object of the invention is to provide a compact valve mechanism wherein a booster valve and trailer valve are arranged in tandem and may be operated automatically by an actuating rod responsive to the pressure in the pedal-controlled master cylinder.

Another object of the invention is to provide a manual control for the trailer valve.

Another object of the invention is to provide a manual device which may be used to operate both the booster valve on the tractor and the trailer valve.

Another object of the invention is to provide a compound valve head adapted to engage spaced valve seats and having means for adjusting the spacing between the portions of the valve head which engage the seats.

Another object of the invention is to provide a construction wherein a single self-contained unit may be installed in connection with ordinary hydraulic brake operating mechanism to provide for power operation of tractor and trailer brakes.

A further object is to provide a device which can be conveniently located anywhere on the tractor vehicle.

Still another object of the invention is to provide a construction in which increase in booster power is dependent upon proportionate increase in pedal pressure so as to make the system more delicately responsive to the operator's control.

A further object of the invention is to provide a remote manual control which may be operated mechanically without requiring hydraulic tubing between the unit and manual control handle.

The invention is illustrated in a preferred embodiment in the accompanying drawings, in which—

Figure 1 is a broken vertical longitudinal sectional view showing the coordinating valve mechanism mounted on a booster motor; Fig. 2, a fragmentary vertical sectional view showing a modification wherein a manual control operates both the booster valve and the trailer valve; and Fig. 3, a diagrammatic view showing a tractor and trailer brake system using the improved device.

The booster motor and its automatically operated valve is similar to that shown in my Patent No. 2,406,328 issued August 27, 1946. An operating cylinder 3 is provided at one end with a closure cap 4 and at its opposite end with a flange head 5, to which is secured the booster motor casing 6 by means of bolts 7.

Within the cylinder 3 is a large piston 8 which is mounted on a tubular rod 9 extending through the head 5 into the casing 6. A conduit 10 connects one end of the cylinder 3 with a pedal operated master cylinder, not shown. Another conduit 11 connects the opposite end of the cylinder 3 to the wheel cylinders of the tractor.

The casing 6 is shown formed of two sections centrally connected by peripheral flanges which grip a cup-shaped flexible diaphragm 12 connected to the rod 9 by a stop plate 13 on one side and a pressure plate 14 on the opposite side. A nut 15 engages a threaded end portion of the rod 9 and clamps the plates and diaphragm together. A compression spring 16 urges the diaphragm to the position illustrated.

The coordinating valve mechanism has a sectional housing 17, having three parts which are held together by bolts 18 so as to grip in spaced relation a flexible diaphragm 19 for the tractor valve and a flexible diaphragm 20 for the trailer valve. Adjacent to the diaphragm 19 is a suction conduit 21 which may lead to the intake manifold of an internal combustion engine, and communicates with an annular seat 22 for the tractor valve. A valve member 23 normally engages this seat under the influence of a compression spring 24. The valve member has an annular flange which forms a seat for an annular fitting 25, which is secured to the daiphragm 19 by a spider-like member 26. The fitting 25 is normally retracted from the seat by the pressure of a compression spring 27, so as to leave an open annular port 28. When the mechanism is in the position illustrated, the interior of the booster motor is in communication with atmosphere through an air filter 29.

The tubular piston rod 9 forms a cylinder for a small piston 30, whose tubular shank contains a helical spring 31 which encircles the end portion of a valve actuating rod 32 and engages a shoulder 33 thereon, so as to make a yielding connection. The rod 32 extends through the casing 6 and has a bifurcated portion 34 that is secured to the annular member 25. The arrangement is such that sufficient pressure on the master cylinder through conduit 10 will move the piston 30 to the right, as viewed in Fig. 1, and will, through the spring 31, cause the rod 32 to move the annular fitting 25 and diaphragm 19 to the right so as to close the annular port 28. Further movement in the same direction will disengage the valve 23 from its seat and will establish communication between the suction conduit 21 and the interior of the casing 6 to lower the pressure in the latter. This will permit atmospheric pressure on the outside of the diaphragm 12, through port 35 in the casing 6, to move the diaphragm to the right carrying with it the piston 8. The fluid thus displaced by the piston 8 passes through the conduit 11 to the several brake cylinders on the tractor. If movement on the foot pedal is stopped, so that no additional fluid is forced through the conduit 10, atmospheric pressure on the diaphragm 19 will compress the spring 31 and shut off the suction line. If the piston 8 is moving to the right under the influence of the booster motor, pressure will be reduced on the small piston 30 and will further facilitate the closing movement of the valve member 23. This operation is the same as set forth in my Patent No. 2,406,328, issued August 27, 1946.

The trailer remote control valve is axially disposed with respect to the booster valve and its chamber 36 communicates with a vacuum line 36' to the trailer, not shown. The diaphragm 20 separates the vacuum chamber 36 from the chamber 37 and is maintained under vacuum by conduit 38 which, like the conduit 21, communicates with a source of suction, usually the intake manifold of the internal combustion motor of the tractor. A push rod 39 impales the diaphragm 20 which has a pair of plates 40 secured to the push rod by means of nuts 40a. A compression spring 41 urges the diaphragm 20 to the left, as viewed in Fig. 1. The push rod extends through a wall 42 of the chamber 36 and engages a compression spring 43 which bears against the spider 26 of the tractor valve mechanism. The portion of the push rod which impales the diaphragm 20 is tubular and affords a valve seat 44 at its open end portion. The tubular portion also has ports 45 in the chamber 36.

The outer end of the casing 17 affords a valve seat 46 adapted to be engaged by a portion of a compound valve head 47. When the valve head is moved to the right by the push rod 39, the chamber 37 is opened to atmosphere through an air filter 48. This movement is yieldingly opposed by a compression spring 49. The valve head 47 has a longitudinally adjustable stem 50, whose end portion is adapted to be engaged by the seat 44 of the push rod 39. Thus it will be understood that when the valve actuating rod 32 moves to the right, to close the booster motor to atmosphere and open it to vacuum, the push rod 39 will also move to the right, close the chamber 37 to vacuum by having the seat 44 engage the end of the stem 50 and push the compound valve head to the right, so as to open the chamber 37 to atmosphere through the filter 48. It is usually desirable to have the brakes on the trailer operated slightly before those on the tractor. The valve 50 is adjusted so that the trailer valve means will operate slightly before the tractor valve means.

In order that the operator of the tractor may control the brakes independently of the pedal energized master cylinder, a manual remote control device is provided. The push rod 39 is provided with studs 51 which serve as a fulcrum for a bifurcated lever 52, whose inner end is cushioned against a compression spring 53. The left end of the spring 53 bears against a flanged sleeve 54 which is secured to the inner walls of the casing 17. A lever 52 extends through a slot in the bottom wall of the casing and preferably is enclosed by rubber sleeve 55, so that all air entering the booster motor through the booster valve must come through the air filter 29. The outer end of the lever 52 may be pivotally connected at 56 to a wire 57 extending through a tube 58 secured to a bracket 59.

By this arrangement, if the wire 57 is pulled inwardly, the push rod 39 will cause the chamber 37 to be closed to vacuum and opened to atmosphere by the valve head 47. As pressure builds up in the chamber 37, the diaphragm 20 will gradually force the push rod 39 and lever 52 to the left against the action of spring 53, and the pressure in the chamber 37 will thus be automatically controlled, depending upon the setting of the lever 52. If the wire 57 is further tensioned, more air will be admitted to the chamber 37, so as to set the brakes on the trailer with a still greater pressure. When the lever is returned to the position shown in Fig. 1, the chamber 37 will again communicate with the source of vacuum, and automatic control through the foot pedal and master cylinder will be resumed.

The entire tractor and trailer brake system using the improved device is shown diagrammatically in Fig. 3. Pressure from the master cylinder through the conduit 10 initially bypasses the piston 8 in the cylinder 3 and applies pressure to the tractor brakes by fluid forced through the conduit 11.

As the pressure increases in cylinder 3, the booster motor is energized by vacuum through conduit 21 connected with the manifold of the engine of the truck. At the same time the booster motor is energized the tandem trailer valve means on the unit causes the trailer brakes to be applied by control through conduit 36' and the trailer relay valve on the trailer.

If it is desired to set the trailer brakes independently of the tractor brakes, the hand lever in the cab of the truck is turned to tension the wire 57. This causes the tandem mounted trailer valve means on the tractor to operate the trailer brakes independently through line 36' and relay valve, without applying the tractor brakes.

As shown in Figure 2, the valve mechanism may be modified so that the manual control will operate both the trailer valve and booster valve. To accomplish this, it is merely necessary to provide a bolt 60 extending through the spider 26 and making a threaded connection with a tapped opening 61 in the push rod 39. It will be understood that the bolt 60 makes an adjustable lost motion connection with the spider. By this arrangement, tension on the wire 57 will cause the booster motor valve and the trailer valve to operate.

The foregoing detailed description is given for clearness of understanding only, and no unnecessary limitations should be understood therefrom, for some modifications will be obvious to those skilled in the art.

I claim:

1. A coordinating valve mechanism for controlling the pressure to a booster motor on a tractor hydraulic brake unit and for controlling the pressure in a vacuum line to a trailer, comprising: an operating cylinder adapted to communicate at one end with a master cylinder; a piston in said operating cylinder provided with a valve actuating rod; booster valve-means actuated by said rod for alternatively connecting the interior of the booster motor with atmosphere or with a source of suction; and trailer valve-means for alternatively connecting a conduit to a trailer with a source of suction or with atmosphere, said trailer valve-means being arranged adjacent to and in tandem with said booster valve-means so that movement of the booster valve means, to energize the booster motor, will actuate the trailer valve-means.

2. Valve mechanism as specified in claim 1, in which a manually operable actuator is provided to operate the trailer valve-means at will.

3. Valve mechanism as specified in claim 1, in which a push rod is provided between tractor valve-means and the trailer valve-means, and a manually operable lever is provided to actuate said push rod, said lever being cushioned against a spring.

4. Valve mechanism as specified in claim 1, in which a push rod is connected to the trailer valve-means and makes a lost motion connection with the tractor valve-means, and a manually operable actuator is provided to engage said push rod and to operate said tractor valve-means and said trailer valve-means.

5. Valve mechanism as specified in claim 1, in which the trailer valve-means has a flexible diaphragm impaled by a tubular rod which communicates on one side of the diaphragm with a source of suction and the opposite end forms a valve seat, and a spring pressed valve head, for controlling communication with atmosphere, is in alignment with said valve seat so that the communication with the source of suction is closed before said spring pressed valve opens communication to atmosphere.

6. Valve mechanism as specified in claim 1, in which the trailer valve-means has a flexible diaphragm impaled by a tubular rod which communicates on one side of the diaphragm with a source of suction and the opposite end forms a valve seat, and a spring pressed compound valve head having one portion adapted to engage and close said valve seat and another portion adapted to close a port to atmosphere, and means for adjusting the spacing between said portions of the valve head.

7. Valve mechanism as specified in claim 1, in which the trailer valve-means has a flexible diaphragm impaled by a tubular rod which communicates on one side of the diaphragm with a source of suction and the opposite end forms a valve seat, and a spring pressed compound valve head having a collar portion adapted to engage and close a port to atmosphere and having an axially adjustable stem portion adapted to engage and close said valve seat.

8. A coordinating valve mechanism for controlling the pressure to a booster motor on a tractor hydraulic brake unit and for controlling the pressure in a vacuum line to a trailer, comprising: an operating cylinder adapted to communicate at one end with a master cylinder; a piston in said operating cylinder provided with a valve actuating rod extending through the booster motor; booster valve-means actuated by said rod for alternatively connecting the interior of said booster motor with atmosphere or with a source of suction; and trailer valve-means for alternatively connecting a conduit to a trailer with said source of suction or with atmosphere, said trailer valve-means being arranged adjacent to and in tandem with said booster valve-means so that movement of the rod to open the booster motor will actuate the trailer valve-means to control the trailer brakes.

9. Valve mechanism as specified in claim 8, in which a compression spring provides a yielding connection between the piston and valve actuating rod.

RALPH R. GUNDERSON.

REFERENCES CITED

The following references are of record in the file of this patent:

UNITED STATES PATENTS

| Number | Name | Date |
|---|---|---|
| 2,191,318 | Hoyt | Feb. 20, 1940 |
| 2,305,638 | Rockwell | Dec. 22, 1942 |
| 2,429,194 | Price | Oct. 14, 1947 |